United States Patent
Maron

(10) Patent No.: US 6,932,438 B2
(45) Date of Patent: Aug. 23, 2005

(54) METHOD FOR ESTABLISHING THE RELATIONSHIP BETWEEN ACTUATOR POSITION AND ACTUATOR TENSIONING FORCE

(75) Inventor: Christof Maron, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/485,010

(22) PCT Filed: Jul. 26, 2002

(86) PCT No.: PCT/EP02/08362

§ 371 (c)(1),
(2), (4) Date: Jan. 28, 2004

(87) PCT Pub. No.: WO03/011668

PCT Pub. Date: Feb. 13, 2003

(65) Prior Publication Data

US 2004/0232762 A1 Nov. 25, 2004

(30) Foreign Application Priority Data

Jul. 31, 2001 (DE) .......................................... 101 37 275
Feb. 7, 2002 (DE) .......................................... 102 05 013

(51) Int. Cl.[7] ............................................. B60T 13/66
(52) U.S. Cl. .......................... 303/20; 188/157; 188/162; 303/112
(58) Field of Search ................................ 303/20, 3, 15, 303/112; 188/156–162

(56) References Cited

U.S. PATENT DOCUMENTS 6,217,131 B1 * 4/2001 Schanzenbach ............. 303/112
6,435,625 B1 * 8/2002 Schwarz et al. .............. 303/20

FOREIGN PATENT DOCUMENTS

| | | |
|---|---|---|
| DE | 19703838 | 8/1998 |
| DE | 19730094 | 1/1999 |
| DE | 19742920 | 4/1999 |
| DE | 19826053 | 12/1999 |
| DE | 19826133 | 12/1999 |
| WO | 0168428 | 9/2001 |

\* cited by examiner

Primary Examiner—Matthew C. Graham
(74) Attorney, Agent, or Firm—Honigman Miller Schwartz and Cohn LLP

(57) ABSTRACT

The present invention relates to a method for establishing the relationship between actuator position and actuator clamping force as well as a control system for applying defined actuator clamping forces to a brake operated electrically using an actuator. The method according to the present invention makes it possible to determine the initially unknown relationship between actuator position and actuator clamping force in real time without using any force sensor at all.

19 Claims, 4 Drawing Sheets

METHOD FOR ESTABLISHING THE RELATIONSHIP BETWEEN ACTUATOR POSITION AND ACTUATOR TENSIONING FORCE

TECHNICAL FIELD

The present invention generally relates to vehicle brake systems and more particularly relates to a method and a control system for establishing the relationship between actuator position and actuator clamping force for a brake which can be operated by an electromechanical actuator.

BACKGROUND OF THE INVENTION

A method is known from WO 99/16650 where the characteristic curve is also established using a special method without force sensor. In that case, an equivalent force value is established which is calculated solely from measured values for the actuator position and actuator torque, as well as their time derivation and various constants. Unknown influencing variables such as friction and damping are calculated using a special periodical activation signal as well as an extensive analysis of the measurements. The disadvantage of this method, in particular, is that all of the measured values for a complete period of the activating signal have to be stored temporarily and then, in a further stage using a complicated analysis process, provide a value of the characteristic curve to be established and representing the above mentioned relationship. This means that this method is not capable of real-time function and also acts on the assumption that the application point is known, i.e. the actuator position where the brake linings are just in contact with the disc but are not yet applying any force. Although a solution to this is provided in WO 99/16650, it requires a very high resolution phase incremental encoder which is very expensive.

BRIEF SUMMARY OF THE INVENTION

It is therefore the object of the present invention to propose a method and a control system that makes it possible to establish the initially unknown relationship between actuation position and actuator clamping force completely without any force sensor and without the above-mentioned disadvantages.

This object is achieved according to the present invention in that a) the range defined by the measured values for the actuator position initially is divided in n part-ranges
b) two software-based low-pass filters of $m^{th}$ degree are assigned to each partial range,
c) an actuator clamping force is calculated from the measured values for the actuator position and the actuator torque corresponding to the actuator efficiency degree $\eta=1$ where the (already known and constant mechanical) variables transmission ratio of the arrangement for the conversion of a rotational movement into a translation and an overall mass moment of inertia are used.
d) the values of the actuator position and the normalized actuator clamping force are fed to those filters that belong to that partial range where the actuator position value is situated, mean values of the actuator position $\phi_{\eta=1,mean}$ and the actuator clamping force $F_{\eta=1,mean}$ corresponding to the actuator efficiency $\eta=1$ being formed by the filters and
e) the unknown relationship between the actuator position and the actuator clamping force corresponding to the actuator efficiency degree $\eta=1$ is identified from the mean values of all part ranges.

A precondition for this system functioning, as also applies in WO 99/16650, is a periodical activation which should preferably be achieved as an additional signal superimposed on the nominal value of the actuator clamping force. The frequency and amplitude of this addition signal are chosen in such a way that the actuator actually carries out the required back and forth movement during normal brake operation though this back and forth movement is not perceived by the driver as a braking force fluctuation.

The present invention uses low-pass filters of the first degree be used. Low-pass filters of the first degree (because they operate effectively and above all with relatively low calculating expenditure) so that the burden on the computing unit can be minimized.

The actuator clamping force $F_{\eta=1}(\phi)$ corresponding to the actuator efficiency degree $\eta=1$ is calculated according to the formula:

$$F_{\eta=1}(\varphi) = \frac{M_{nominal} - J\ddot{\varphi}}{i}$$

where $M_{nominal}$ represents the actuator torque, i represents the transmission ratio of the arrangement for the conversion of the rotational movement of the electric motor into a translation, J represents the mass moment of inertia and $\phi$ represents the actuator rotational acceleration. The specified formula results from a simple physical model observation under omission of all friction. The friction is calculated from the result automatically through the applied periodical back and forth movement and the mean value formation by the low-pass filters.

The analytical relationship between actuator position and actuator clamping force used for the calculation of an actual value for the actuator clamping force for each measured actuator position is described by an offset value of the actuator ($F_o$), an offset value of the actuator position ($\phi_o$), a scaling factor (a) and a describing function to be defined beforehand f ($\phi$) with the formula:

$$F_{estim}(\phi) = F_0 + a \cdot f(\phi - \phi_0)$$

A particular advantage with this analytical description is the constant number of initially unknown parameters $F_o$, $\phi_o$, a, so that the method can be carried out equally for identifying the relationship of any function f ($\phi$).

An identification method that minimizes the following quality criterion is used for the calculation of the parameters ($\phi_o$, $F_o$, a) describing the relationship between actuator position and actuator clamping force:

$$E = \sum_{i=0}^{l(\varphi_0)} c_i \cdot (F_{\eta=1,mean}(i) - F_0)^2 + \sum_{i=l(\varphi_0)}^{l(\varphi_{max})} c_i \cdot ((F_{\eta=1,mean}(i) - F_0) - a \cdot f(\varphi_{\eta=1,mean}(i) - \varphi_0))^2$$

where $c_i$ represents weighting factors for different weighting of the mean values. The use of this quadratic quality criterion allows an analytical determination of the partial derivations with regard to unknown parameters so that the equations describing the parameters can be easily calculated.

According to an advantageous invention characteristic, the weighting factors are chosen in such a way that mean values that can be gained from a larger quantity of measured data have more influence on the identification result. This step increases the precision of the identification process because the mean values gained from the greater quantity of measured data are more precise than the mean values or the values that are only formed from few measured data pairs.

A good adaptability of the slowly changing parameters (e.g. with the temperature) describing the relationship between actuator position and actuator clamping force is achieved with a further advantageous characteristic of the present invention by that the weighting factors are chosen in such a way that new mean values have more influence on the identification result.

Even if the actuator clamping force can be estimated from the estimated relationship between actuator position and actuator clamping force with the help of travel measurements, a measurement of the actuator clamping force is undoubtedly more accurate. Therefore, if (e.g. for reasons of precision) a force sensor is present, the aforesaid relationship can also be established with the described method, however, in this case it is advantageous to use the actual measured actuator clamping force instead of the actuator efficiency degree $\eta=1$. The estimated relationship can then serve, for instance, as fall-back mode for situations where the force sensor fails or errors by the force sensor can be established.

A compromise between costs and precision is achieved with another advantageous embodiment of the object of invention by that the actuator clamping force is measured within a prescribed measuring range using a force sensor, and outside that measuring range the actuator clamping force ($F_{\eta=1}$) corresponding to the actuator efficiency degree $\eta=1$ is used.

The force sensor preferably covers the range of actuator clamping forces lying below a clamping force threshold. This range is used the most frequently during the operation of the brake. The "upper" actuator clamping force range (e.g. panic braking, crawling downhill), in comparison, is hardly ever used and any loss of comfort (e.g. because of imprecise travel/force characteristic curve estimation) within this force range is more likely to be tolerated.

As the required back and forth movement necessary for estimating the actuator clamping force costs energy and wear because of neglected friction, it is advisable for the aforementioned sinusoidal oscillation to only be superimposed within the range where the force sensor cannot provide any values.

If the oscillation superimposed on the required value of the actuator clamping force is not applied by the actuator for physical reasons, the recorded measured values should not be included in the estimate as they would corrupt the measurement because the disregarded friction can no longer be determined. For this reason, the established values for the actuator position and the actuator clamping force corresponding to the actuator efficiency degree $\eta=1$ are only then fed into the appropriate filters when the superimposed sinusoidal oscillation is noticeable in the movement.

If the travel/force characteristic curve is completely unknown when restarting the system and if no measured values are available yet, it is advisable during an initialization phase to have all measured data of equal weight flow into the calculation of the values of the characteristic curve and only then start the low-pass filter. For this reason, the present invention foresees that an initialization is carried out when the actuator is restarted where the resulting measured data are subjected to a simple mean-value generation and the established mean value pairs used as initial values for the low-pass filter.

A control system according to the present invention for applying defined clamping forces on a brake operated electrically by an actuator with which the aforementioned method can be achieved consists mainly of an initial controller (actuator clamping force controller) into which a signal representing the nominal value of the actuator clamping force and a signal representing the actual value of the actuator clamping force are fed as input parameters and the output parameter of which represents a nominal value of the actuator speed, a second controller (actuator speed controller) inserted after the first controller into which a signal representing the nominal value of the actuator speed and a signal representing the actual value of the actuator speed are fed as input parameters and the output parameter of which represents a nominal value of the actuator torque and a third controller (current controller) inserted after the second controller into which a signal representing the nominal value of the actuator torque and a signal representing the actual value of the motor current are fed as input parameters and the output parameter of which is a manipulated variable for setting the actual value of the current to be fed into the actuator.

The control system according to the present invention is characterized mainly by a) having a data reduction module where the parameter pairs of the relationship between actuator position and actuator clamping force are determined and into which signals representing the actual value of the actuator position and the actual value of the actuator torque are fed as input parameters, b) having a characteristic curve identification module where the relationship between the actuator position and the actuator clamping force is determined using the value pairs, and c) having a transformation module where the relationship from the measured value of the current actuator position determined in the characteristic curve identification module is used to calculate an actual value of the actuator clamping force corresponding to this position which is fed into the actuator clamping force controller.

With the aforementioned measures, the method is split into three different modules during its realization, each of which fulfils a self-contained function and therefore can be developed and maintained separately from each other.

An advantageous development of the control system according to the present invention consists of the data reduction module and the transformation module being processed in real time in such a manner that every occurring measured value in the data reduction module is taken into account and an appropriate actuator clamping value is calculated for each measured actuator position. As a result thereof each measured value pair has an actual influence on the estimate of the characteristic curve.

The actual estimation, i.e. the determination of the parameters describing the characteristic curve, involves intensive computation and should therefore preferably be computed in the background particularly as the re-determination of parameters is only advisable if sufficient new measured values have occurred beforehand. It is therefore advisable that the characteristic curve identification module is processed in time available outside of the control process.

With an advantageous development of the control system according to the present invention, a measured value of the actuator clamping force which assists the determination of the value pair of the relationship between actuator position and actuator clamping force within the valid measurement range and which is determined using a force sensor is fed into the data reduction module as further input parameter. An actual value of the actuator clamping force is preferably used as controlled variable which results from the sum of the measured value of the actuator clamping force weighted with a weighting factor k (0<=k<=1) and an actual value of the actuator clamping force calculated by the transformation module with a weighting factor (1-k).

A transient-free switch-over between pure measurement and pure estimation is achieved by the weighting factor k being set to 1 in the lower measurement range of the force sensor and by linear degression diminishing to 0 in the upper measurement range.

DETAILED DESCRIPTION OF THE PREFERRED EMBODIMENTS

Figure 1:
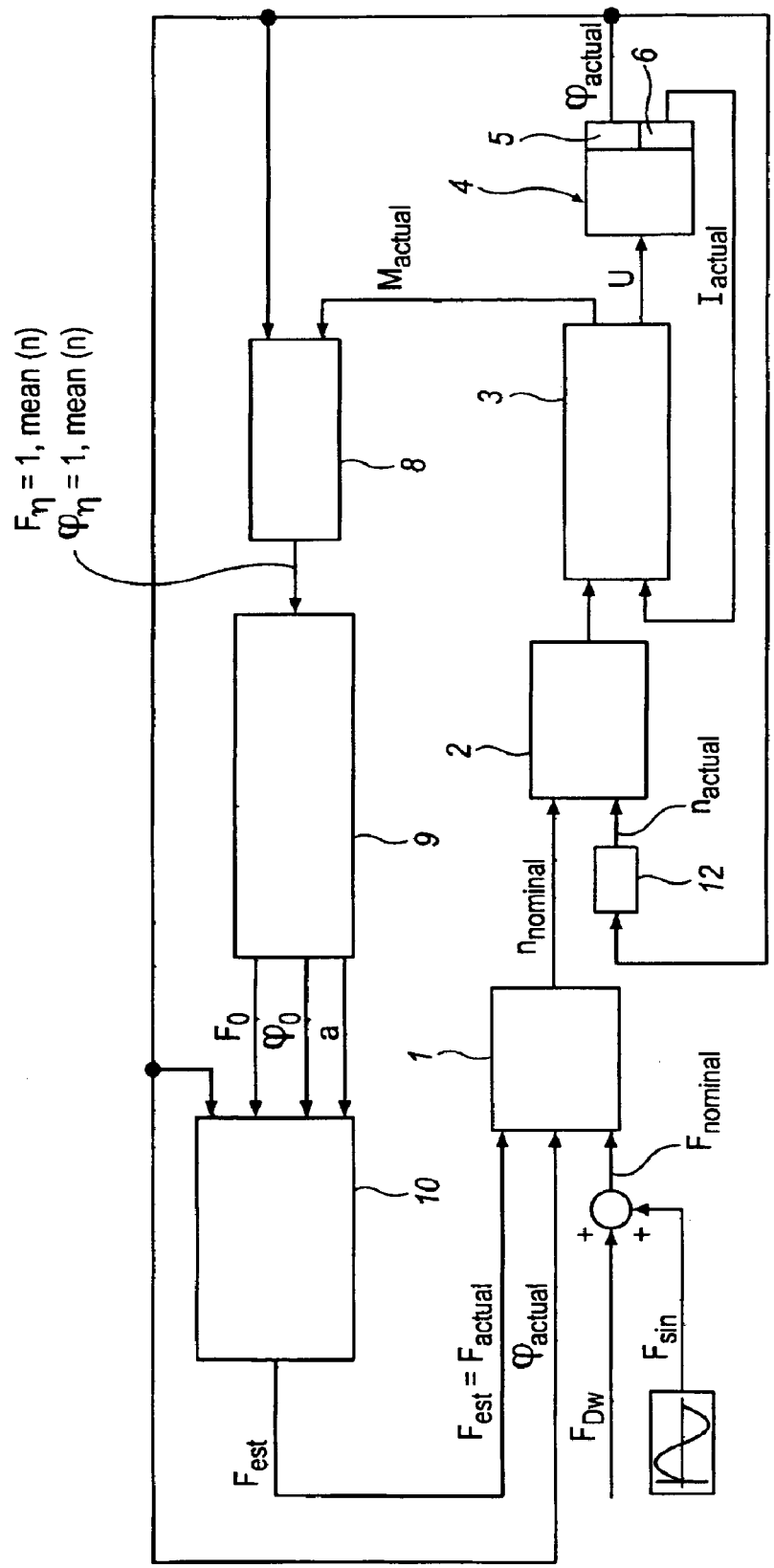
FIG. 1 shows a first embodiment of a control system for achieving the method according to the present invention.

The control system depicted in FIG. 1 consists mainly of a first controller or actuator clamping force controller 1, a second controller or actuator clamping force controller 2 inserted after the actuator clamping force controller 1 and third controller or current controller inserted after the actuator clamping force controller 2 with an integrated servo-booster generating a voltage U which is applied to an actuator 4 (only shown schematically) of an electro-mechanically operated brake. Actuator 4 consists mainly of an electric motor as well as an arrangement for converting the rotational movement of the electric motor into a translation, where the transmission ratio of the arrangement is indicated by I, and the overall mass moment of inertia of the actuator 4 is indicated by J. A second output signal of the current controller 3 represents an actual value of the actuator torque $M_{actual}$. Actuator 4 is preferably equipped with a position measuring system 5 as well as a current sensor 6. The output signal $\phi_{actual}$ of the position measuring system 5 representing the measured actuator position as well as the signal $M_{actual}$ representing the actual value of the actuator torque are fed into a data reduction module as input parameters. The signal $I_{actual}$ of current sensor 6 corresponding to the actual value of the actuator current is fed into the aforementioned current controller 3 as input parameter. Value pairs of a relationship between the actuator position $\phi_{\eta=1,mean}$ (n) and the sought actuator clamping force $F_{\eta=1, mean}$ (n) are determined in the data reduction module 8 and are fed into characteristic curve identification module 9. The aforementioned relationship between actuator position and actuator clamping force is determined from the value pairs in the characteristic curve identification module 9, where the parameters $F_o$, $\phi_o$ and a representing an offset value of the actuator clamping force, an offset value of the actuator position and a scaling factor are calculated. The sought relationship is calculated with these parameters, a pre-defined describing function and the actual value of the actuator position $\phi_{actual}$ in a transformation module 10 using the formula:

$$F_{estim}(\phi) = F_0 + a \cdot f(\phi - \phi_0)$$

The calculated actuator clamping force $F_{estim.}$ ($\phi$), the actual value of the actuator position $\phi_{actual}$ measured on actuator 4 and a nominal value of the actuator clamping force $F_{theor}$ are fed into the first controller 1 as input parameters. The nominal value of the actuator clamping force $F_{theor}$ consists preferably of a first value $F_{Dw}$ preselected by the driver and complying with driver's deceleration wishes, and an superimposed, periodically changing second value $F_{sin}$ corresponding to the back and forth movement of actuator 4 which are added together at an addition point 11.

In addition, FIG. 1 also shows that the output parameter $n_{nominal}$ of the first or actuator clamping force controller 1 which represents a nominal value of the actuator speed is the first input parameter to be fed into the actuator speed controller 2. Its second input parameter is formed by an actual value of the actuator speed $n_{actual}$ that is obtained from the time differentiation of the aforementioned actual value of the actuator position $\phi_{actual}$ in a differentiator being marked with reference no. 12. The output parameter of the second controller corresponding to the nominal value of the actuator torque $M_{nominal}$ is then fed as second input parameter to the third controller or current controller.

Figure 2:
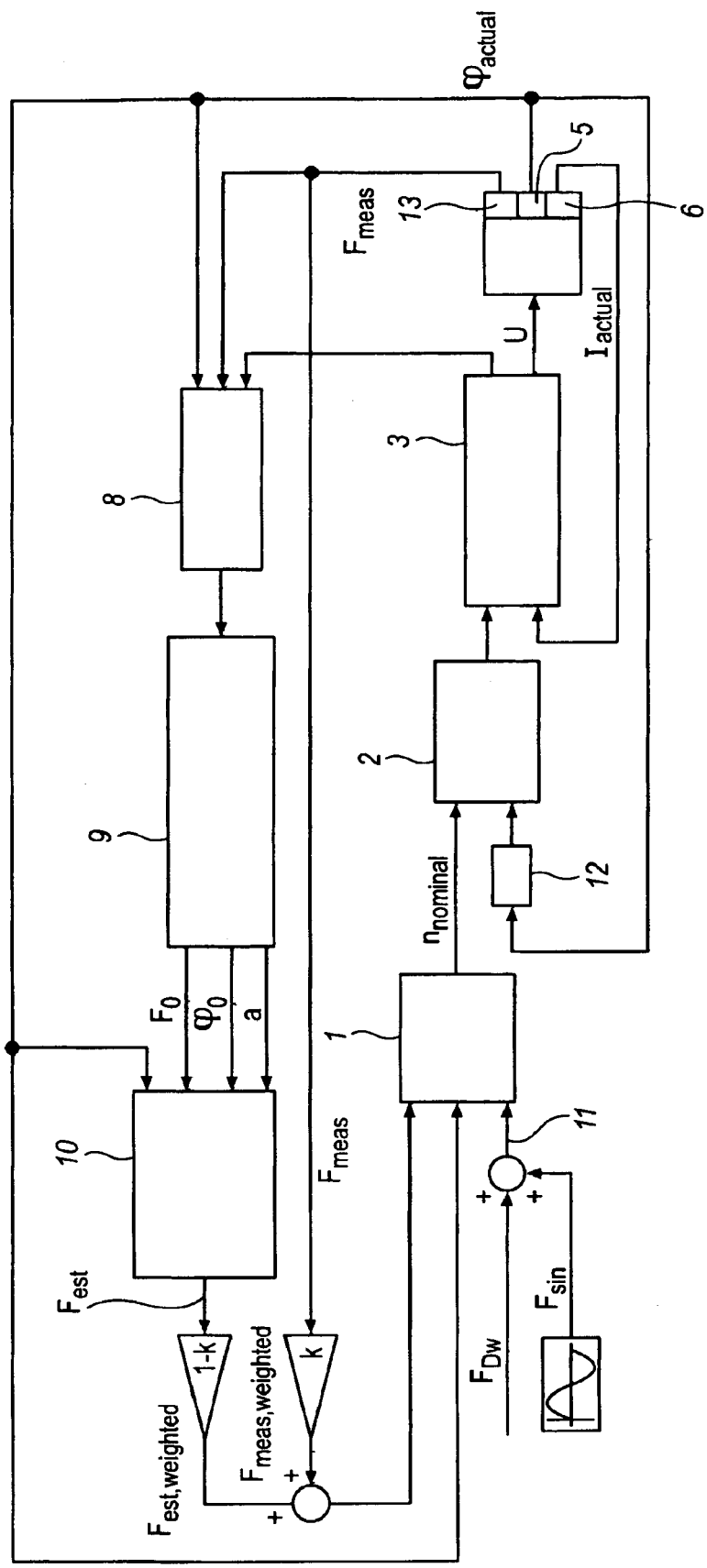
FIG. 2 shows a second arrangement of a control system for achieving the method according to the present invention.

The second embodiment of the control system according to the present invention as shown in FIG. 2 corresponds largely with the first design which was explained in combination with FIG. 1.

In this case, components already mentioned are provided with the same reference numbers. The difference to the control system shown in FIG. 1 is that the actuator 4 is equipped with a force sensor 13 with which the clamping force $F_{meas}$ provided by actuator 4 is determined. The signal representing the actuator clamping force $F_{meas}$ is fed into the data reduction module 8 as a third input parameter, the force sensor 13 covering a pre-selected measurement range including "small" actuator clamping forces during the controlling process. For this, the signal representing the actuator clamping force $F_{meas}$ is multiplied or "weighted" by an initial adjustable gain factor k ($F_{meas, weight}$) which is indicated by the symbol 14, while the output parameter $F_{estim}$ of the transformation module 10 is multiplied or "weighted" with a second adjustable gain factor 1-k ($F_{est, weight}$ ($\phi$)) which is indicated by the symbol 15. An actual value of the actuator clamping force $F_{actual}$ ($\phi$) which is formed as the sum of $F_{meas, weight} + F_{est, weight}$ ($\phi$) is then fed into the aforementioned actuator clamping force controller 1 as input parameter. As already mentioned above, the gain or weighting factor k is set to "1" in the lower measurement range of the force sensor 13 and is reduced to 0 by linear degression in the upper measurement range (at the upper end of the measurement range).

Figure 3:
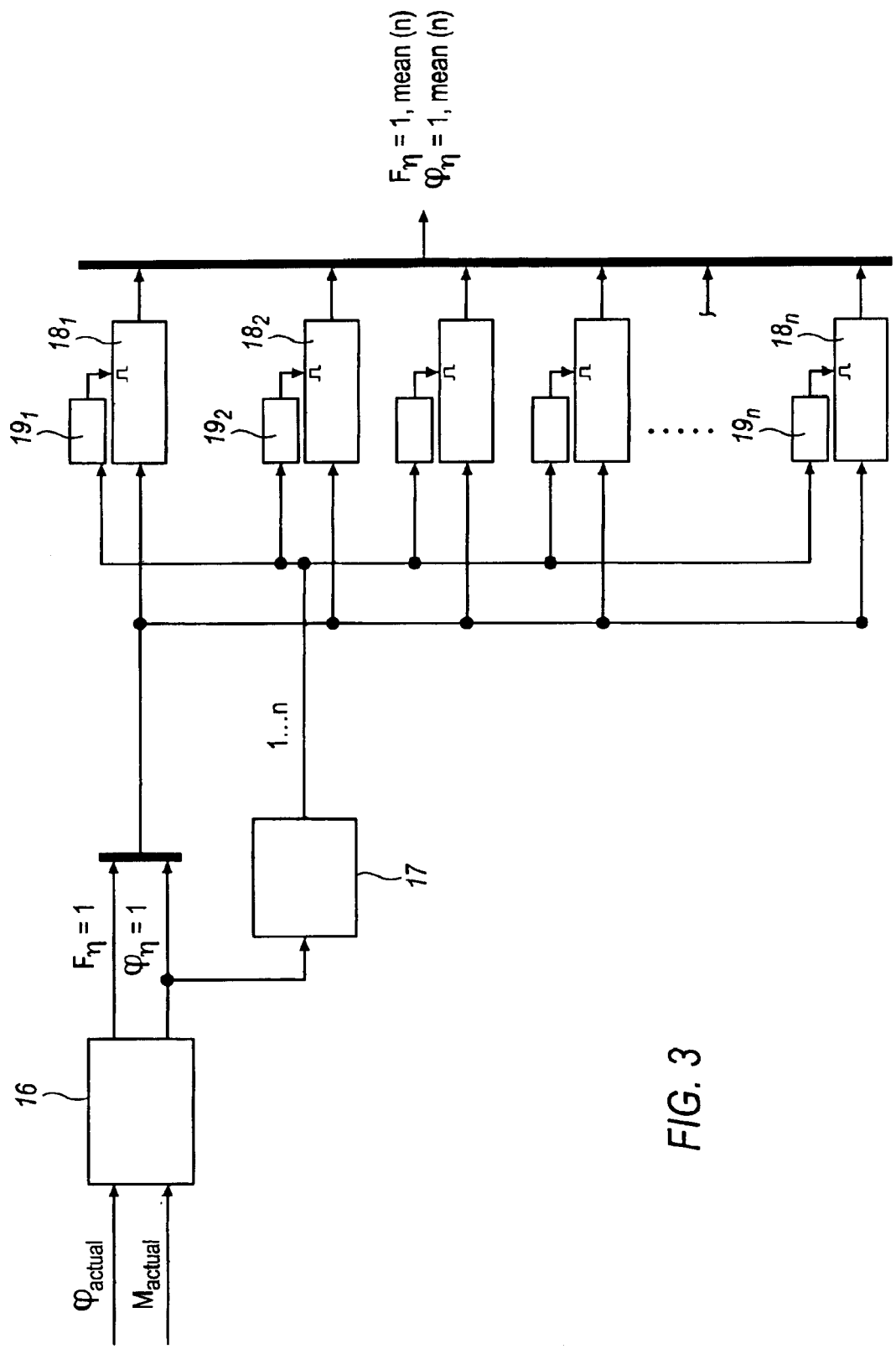
FIG. 3 shows the configuration of a data reduction module as used in a control system according to FIG. 1.
Figure 4:
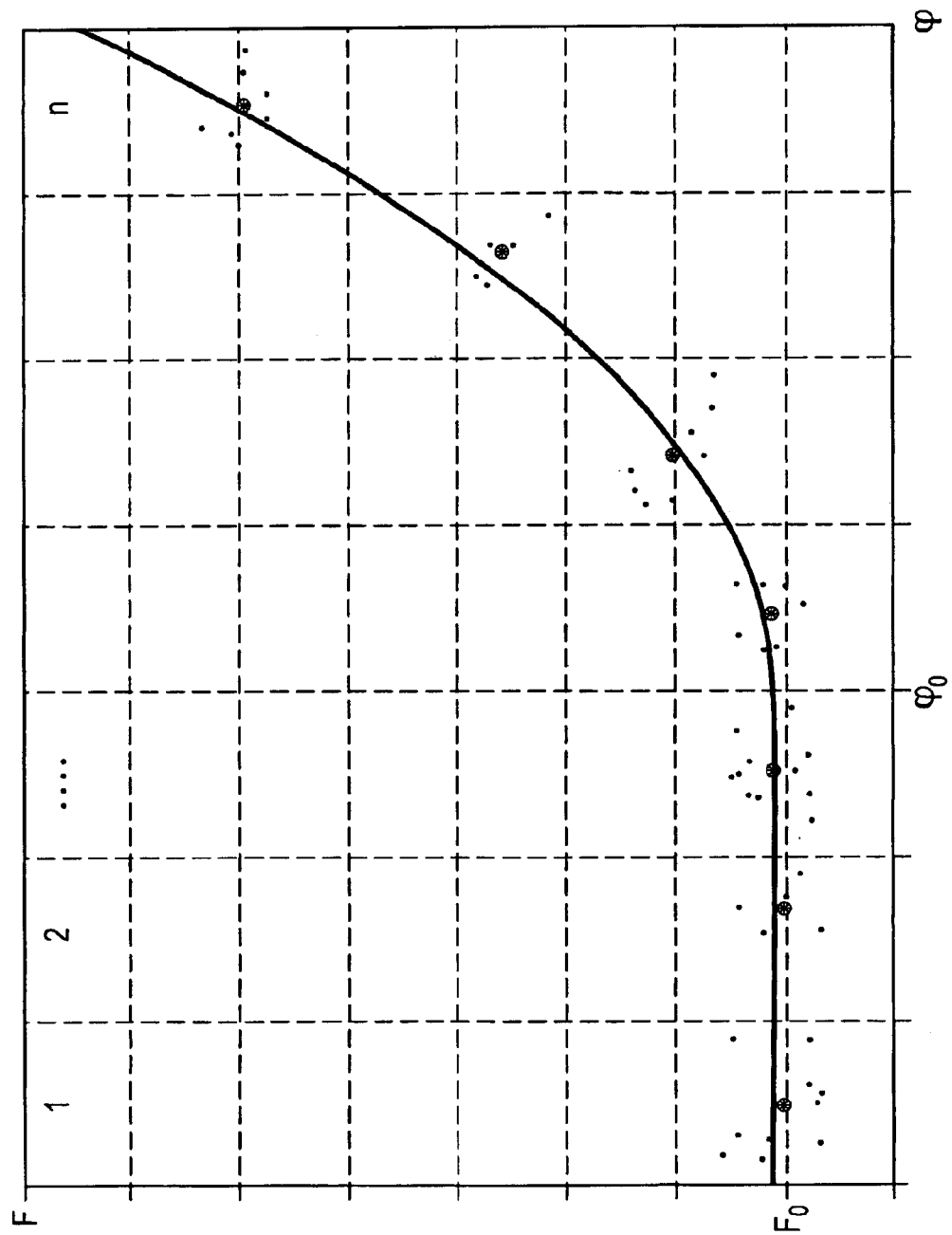
FIG. 4 shows a diagrammatic presentation of the dependency of the actuator clamping force on the actuator position as explanation of the method according to the present invention.

As already indicated above, the method according to the present invention is carried out in the data reduction module 8, the configuration of which is shown in FIG. 3. To carry out the process, the range defined by the measured values for the actuator position $\phi_{actual}$ is divided into n partial ranges as shown in FIG. 4. An actuator clamping force $F_{\eta=1}$ corresponding to the actuator efficiency degree $\eta=1$ is calculated from the value pairs $M_{actual}$, $\phi_{actual}$ mentioned in connection with FIG. 1 in a first function block 16 where the two input signals are filtered and a signal $\phi$ corresponding to the actuator efficiency degree $\eta=1$ is generated, according to the formula:

$$F_{\eta=1}(\varphi) = \frac{M_{actual} - J\ddot{\varphi}}{i}$$

as well as an actuator position $\phi_{\eta=1}$ corresponding to the actuator efficiency degree $\eta=1$, the meaning of the above used terms having already been explained. The named parameters $F_{\eta=1}$, $\phi_{\eta=1}$ are fed into the low-pass filter pairs (marked with the reference numbers $18_1$, $18_2$ . . . $18_n$) assigned to the already mentioned partial ranges 1 . . . n. At the same time, the output signal $\phi_{\eta=1}$ of function block 16, which represents the actuator position corresponding to the actuator efficiency degree $\eta=1$, is fed into a second function block 17. The second function block 17 is used for determining the partial range, the output parameter of which represents a Figure which identifies the partial range assigned to the actuator position corresponding to the actuator efficiency degree $\eta=1$. The Figure is assigned to the filter activation blocks $19_1$, $19_2$ . . . $19_n$ assigned to filter pairs $18_1$, $18_2$ . . . $18_n$, the filter blocks activating the respective filter pairs. The output parameters of the filter pairs $18_1$, $18_2$ . . . $18_n$ are the already mentioned averaged value pairs $F_{\eta=1, mean}$ and $\phi_{\eta=1, mean}$.

Finally, FIG. 4 provides a diagrammatic presentation of the system according to the present invention where values for the actuator position $\phi_{\eta=1}$ corresponding to the actuator efficiency degree $\eta=1$ are applied to the x axis and values for the actuator clamping force $F_{\eta=1}$ corresponding to the actuator efficiency degree $\eta=1$ are applied to the y axis. The "black" dots shown in each of the partial ranges 1 . . . n represent the already mentioned, calculated value pairs $F_{\eta=1}$, $\phi_{\eta=1}$, whilst the values marked with * represent the value pairs $F_{\eta=1,mean}$ averaged by the filter pairs $18_1$, . . . $18_n$. The drawn curve represents the force/position characteristic curve of the actuator as determined using the method according to the present invention, the meaning of the symbols $F_o$ and $\phi_o$ having been explained in the preceding text. The scaling factor a as also explained in the preceding text corresponds with the characteristic curve for $\phi > \phi_o$ which has been chosen as a parabola in the shown example.

What is claimed is:

1. Method for establishing the relationship between actuator position and actuator clamping force for a brake which is operated by an electromechanical actuator wherein the actuator includes an electric motor and an arrangement operatively engaged to the electric motor to convert a rotational movement of the electric motor into a translation, wherein a torque created by the actuator is determined by measuring an electrical current fed into the electric motor and an actuator position is measured and wherein a sinusoidal oscillation of small amplitude being superimposed on the actuator movement, comprising the steps of:

a) defining a range by the measured values of the actuator position and dividing the range into n partial ranges, b) assigning each one of said n partial ranges two software-based low-pass filters of $m^{th}$ degree, c) calculating an actuator clamping force corresponding to the actuator efficiency degree $\eta=1$, wherein said actuator clamping force is calculated from the measured values for the actuator position and the actuator torque where a transmission ratio of the arrangement is used for conversion of a rotational movement into a translation measurement and an overall moment of inertia d) feeding the values of the actuator position and the actuator clamping force $F_{\eta=1}$ corresponding to the actuator efficiency degree $\eta=1$ to those filters that belong to a partial range where the actuator position value is situated, wherein mean values of the actuator position ($\phi_{\eta=1, mean}$(i)) and the actuator clamping force ($F_{\eta=1, mean}$(i)) corresponding to the actuator efficiency degree $\eta=1$ are formed by the filters, and e) identifying the relationship between the actuator position and the actuator clamping force from the mean values of all of said n partial ranges.

2. Method according to claim 1, wherein low-pass filters of the first order are used.

3. Method according to claim 1, wherein the actuator clamping force corresponding to the actuator efficiency degree $\eta=1$ is calculated using the formula $$F_{\eta=1}(\varphi) = \frac{M_{Act} - J\ddot{\varphi}}{i}$$

where $M_{actual}$ indicates he actuator torque, i represents the transmission ratio of the arrangement for the conversion of the rotational movement of the electric motor into a translation, J represents the overall mass moment of inertia of the actuator and $\ddot{\varphi}$ represents the actuator rotational acceleration.

4. Method according to claim 1, wherein the relationship between the actuator position and the corresponding actuator clamping force is described analytically by an offset value of the actuator clamping force ($F_o$), an offset value of the actuator position ($\phi_o$), a scaling factor (a) and a describing function to be defined beforehand f ($\phi$) with the formula:

$$F_{estim}(\phi) = F_0 + a \cdot f(\phi - \phi_0).$$

5. Method according to claim 4, wherein an identification process that minimizes the following quality criterion is used for the calculation of the parameters ($\phi_o$, $F_o$, a) describing the relationship between actuator position and actuator clamping force:

$$E = \sum_{i=0}^{I(\varphi_0)} c_i \cdot (F_{\eta=1,mean}(i) - F_0)^2 + \sum_{i=I(\varphi_0)}^{I(\varphi_{max})} c_i \cdot ((F_{\eta=1,mean}(i) - F_0) - a \cdot f(\varphi_{\eta=1,mean}(i) - \varphi_0))^2$$

where $c_i$ represents weighting factors for different weighting of the mean values.

6. Method according to claim 5, wherein the weighting factors $c_i$) are chosen in such a way that mean values that have been gained from a larger quantity of measured data have more influence on the identification result.

7. Method according to claim 5, wherein the weighting factors are chosen in such a way that new mean values have more influence on the identification result.

8. Method according to claim 1, wherein the actuator clamping force ($F_{actual}$) is measured by means of a force sensor and is used for calculation instead of the actuator clamping force ($F_{\eta=1}$) corresponding to the actuator efficiency degree $\eta=1$.

9. Method according to claim 8, wherein the actuator clamping force ($F_{actual}$) is measured within a prescribed measuring range by means of a force sensor and outside that measuring range the actuator clamping force ($F_{\eta=1}$) corresponding to the actuator efficiency degree $\eta=1$ is used.

10. Method according to claim 8, wherein the force sensor covers the range of actuator clamping forces lying below a clamping force threshold.

11. Method according to claim 8, wherein the sinusoidal oscillation can only be superimposed within the measurement range where the force sensor cannot provide any values.

12. Method according to claim 1, wherein the established values for the actuator position and the actuator clamping force corresponding to the actuator efficiency degree η=1 are only then fed into the appropriate filters if the superimposed sinusoidal oscillation is noticeable in the movement.

13. Method according to claim 8, wherein that an initialization is carried out when the actuator is restarted, the resulting measured data being subjected to a simple mean-value generation and the established mean value pairs are used as lower range values for the low-pass filter.

14. Control system for applying defined clamping forces on a brake operated electrically by an actuator, comprising:
 a first actuator clamping force controller into which a signal representing the nominal value of the clamping force ($F_{nominal}$) and a signal representing the actual value of the actuator clamping force ($F_{actual}$) are fed as input parameters and the output parameter of which represents an nominal value of the actuator speed ($n_{nominal}$),
 a second speed controller inserted after the first controller into which a signal representing the nominal value of the actuator speed ($n_{nominal}$) and a signal representing the actual value of the actuator speed ($n_{actual}$) are fed as input parameters and the output parameter of which represents a nominal value of the actuator torque ($M_{nominal}$), and
 a third current controller inserted after the second controller into which a signal representing the nominal value of the actuator torque ($M_{nominal}$) and a signal representing the actual value ($I_{actual}$) of the current to be fed into the actuator are fed as input parameters and the output parameter of which is a manipulated variable (U) for setting the actual value ($I_{actual}$) of the current to be fed into the actuator, wherein
 a) a data reduction module for determining the parameter pairs ($F_{\eta=1,mean}(i)$, $\phi_{\eta=1,mean}(i)$) of the relationship between actuator position ($\phi$) and actuator clamping force (F) and into which signals representing the actual value of the actuator position ($\phi_{actual}$) and the actual value of the actuator torque ($M_{mot}$) are fed as input parameters,
 b) a characteristic curve identification module for determining the parameters (F0, $\phi_0$, a) describing the relationship between the actuator position ($\phi$) and for determining the actuator clamping force (F) from the value pairs $F_{\eta=1, mean}(i)$, $\phi_{\eta=1,mean}(i)$, where ($F_0$) represents an offset value of the actuator clamping force, ($\phi_0$) represents an offset value of the actuator position, (a) represents a scaling factor, and
 c) a transformation module for using the relationship from the actual value of the actuator position ($\phi_{actual}$) determined in the characteristic curve identification module to calculate an actual value of the actuator clamping force ($F_{est}(\phi)$) corresponding to this position which is fed into the actuator clamping force controller.

15. Method according to claim 14, wherein the data reduction module and the transformation module process data in real time in such a manner that every occurring measured value in the data reduction module is taken into account and an appropriate actuator clamping value is calculated for each measured actuator position.

16. Method according to claim 14, wherein the characteristic curve identification module is processed in a time available outside of the control process.

17. Method according to claim 14, wherein an actuator clamping force measured value which assists the determination of the value pair of the relationship between actuator position and actuator clamping force within the measurement range and which is determined using a force sensor is fed into the data reduction module as further input parameter.

18. Method according to claim 17, wherein an actuator clamping force actual value ($F_{actual}$) is used as controlled variable and which results from the sum of the actuator clamping force measured value ($F_{meas, weighted}$) weighted with a weighting factor k (0<=k<=1) and an actuator clamping force actual value ($F_{est, weighted}$) calculated by the transformation module with a weighting factor (1−k).

19. Method according to claim 18, wherein the weighting factor k is set to 1 in the lower measurement range of the force sensor and diminishes by linear degression to 0 in the upper measurement range.

* * * * *